United States Patent
Nothdurfter et al.

(10) Patent No.: US 11,312,424 B2
(45) Date of Patent: Apr. 26, 2022

(54) VEHICLE LOAD-BEARING STRUCTURE

(71) Applicant: AUTOMOBILI LAMBORGHINI S.P.A., Sant'Agata Bolognese (IT)

(72) Inventors: Stefan Klaus Nothdurfter, Formigine (IT); Andrea Aguggiaro, Padua (IT); Karsten Schuffenhauer, San Giovanni in Persiceto (IT)

(73) Assignee: Automobili Lamborghini S.P.A., Sant'Agata Bolognese (IT)

( * ) Notice: Subject to any disclaimer, the term of this patent is extended or adjusted under 35 U.S.C. 154(b) by 102 days.

(21) Appl. No.: 16/348,727

(22) PCT Filed: Dec. 13, 2017

(86) PCT No.: PCT/IB2017/057893
§ 371 (c)(1),
(2) Date: May 9, 2019

(87) PCT Pub. No.: WO2018/116077
PCT Pub. Date: Jun. 28, 2018

(65) Prior Publication Data
US 2019/0283810 A1    Sep. 19, 2019

(30) Foreign Application Priority Data

Dec. 22, 2016 (IT) .................. 102016000130313

(51) Int. Cl.
*B62D 29/04* (2006.01)
*B62D 25/20* (2006.01)
(Continued)

(52) U.S. Cl.
CPC ........... *B62D 29/046* (2013.01); *B62D 23/00* (2013.01); *B62D 25/2009* (2013.01);
(Continued)

(58) Field of Classification Search
CPC .. B62D 23/00; B62D 29/046; B62D 25/2036; B62D 25/2027; B62D 25/2018; B62D 25/2045; B62D 25/2009
(Continued)

(56) References Cited

U.S. PATENT DOCUMENTS 4,422,685 A * 12/1983 Bonfilio ................. B62D 21/00
296/193.04
4,521,049 A * 6/1985 Genma .................... B60G 3/02
296/181.2
(Continued)

FOREIGN PATENT DOCUMENTS

CN  1402678 A   3/2003
CN  103402858 A  11/2013
(Continued)

OTHER PUBLICATIONS

International Search Report and Written Opinion dated Mar. 20, 2018 for counterpart PCT Application No. PCT/IB2017/057893.
(Continued)

*Primary Examiner* — Jason S Morrow
(74) *Attorney, Agent, or Firm* — Shuttleworth & Ingersoll, PLC; Timothy Klima

(57) ABSTRACT

A vehicle load-bearing structure includes a cell made of composite materials and composed of a plurality of components joined to each other by at least one joining system to form a single structure; the cell is made up of a number n of components between 3 and 8, that is 3<n<8.

26 Claims, 4 Drawing Sheets

(51) Int. Cl.
  *B62D 23/00*  (2006.01)
  *B62D 31/00*  (2006.01)
  *B62D 25/06*  (2006.01)

(52) U.S. Cl.
  CPC ..... *B62D 25/2018* (2013.01); *B62D 25/2027* (2013.01); *B62D 25/2036* (2013.01); *B62D 25/2045* (2013.01); *B62D 25/06* (2013.01); *B62D 29/048* (2013.01); *B62D 31/003* (2013.01)

(58) Field of Classification Search
  USPC .......................................... 296/181.2, 193.04
  See application file for complete search history.

(56) References Cited

U.S. PATENT DOCUMENTS

| | | | | |
|---|---|---|---|---|
| 4,676,545 | A * | 6/1987 | Bonfilio | B62D 21/00 114/357 |
| 4,917,435 | A * | 4/1990 | Bonnett | B62D 29/00 296/190.08 |
| 6,276,477 | B1 * | 8/2001 | Ida | B62D 21/07 180/89.1 |
| 6,854,791 | B1 | 2/2005 | Jaggi | |
| 7,264,304 | B2 * | 9/2007 | Carcioffi | B62D 21/12 180/312 |
| 8,690,226 | B2 * | 4/2014 | Ellis | B60N 2/012 296/181.2 |
| 9,682,730 | B2 * | 6/2017 | Huber | B62D 25/2009 |
| 2004/0070233 | A1 * | 4/2004 | Steinhauser | B60R 21/13 296/193.01 |
| 2012/0104793 | A1 * | 5/2012 | Danielson | B62D 29/046 296/181.1 |
| 2012/0104799 | A1 * | 5/2012 | Danielson | B62D 29/048 296/193.06 |
| 2012/0104803 | A1 * | 5/2012 | Thomas | B62D 29/046 296/203.01 |
| 2013/0313863 | A1 * | 11/2013 | Yamaji | B29C 66/131 296/203.01 |
| 2015/0158532 | A1 * | 6/2015 | Ayuzawa | B62D 25/2027 296/193.07 |
| 2017/0267290 | A1 * | 9/2017 | Ayuzawa | B62D 29/04 |
| 2019/0329823 | A1 * | 10/2019 | Lutz | B62D 23/005 |
| 2020/0331533 | A1 * | 10/2020 | Jin | B60N 2/012 |

FOREIGN PATENT DOCUMENTS

| | | |
|---|---|---|
| DE | 10340952 A1 | 4/2005 |
| DE | 102010014574 A1 | 10/2011 |
| EP | 2183148 A1 | 5/2010 |
| EP | 2574449 A2 | 4/2013 |
| EP | 2683535 A1 | 1/2014 |
| FR | 2953442 A1 | 6/2011 |
| FR | 3026079 A1 | 3/2016 |
| GB | 2521937 A | 7/2015 |
| WO | 0128845 A1 | 4/2001 |

OTHER PUBLICATIONS

Chinese Office Action dated Feb. 2, 2021 from counterpart Chinese Patent Application No. 2017800791601.

* cited by examiner

VEHICLE LOAD-BEARING STRUCTURE

This application is the National Phase of International Application PCT/IB2017/057893 filed Dec. 13, 2017 which designated the U.S.

This application claims priority to Italian Patent Application No. 102016000130313 filed Dec. 22, 2016, which application is incorporated by reference herein.

TECHNICAL FIELD

This invention relates to a vehicle structure, and more specifically, a structure made of a composite material and intended for use as a "monocoque" for high powered, super sports cars.

BACKGROUND ART

As is known, monocoques of composite materials, in particular carbon fibre reinforced polymers, generally designed as single structures, have been developed for super sports cars in the horsepower range of approximately 500 HP to 1200 HP.

Most of the structures known as composite material "monocoques", however, are in actual fact made up of different, separately cast components assembled using known fastening technologies to form a single structure.

The separate components, therefore, are first made and then assembled at a later stage to obtain the "monocoque" which constitutes a single rigid structure bearing the load of other parts of the vehicle.

Patent document EP2683535 in the name of the same applicant as the present, relates to a process for manufacturing composite material products, in particular shells, or cells, and roofs for monocoques of motor vehicles.

As may be inferred from that document, even modern monocoque solutions are made up of a plurality of components which are made and assembled in separate stages to form the single structure.

Prior art monocoques are therefore complex and their production involves a long and intricate chain of operations. Once the design of the structure as a whole has been completed, it cannot be modified owing to the large number of components needed to make it.

For example, if a monocoque for a rear engine car has been made, it has to be designed anew for a front engine car.

DISCLOSURE OF THE INVENTION

In this context, the main purpose of this invention is to propose a vehicle structure to overcome the above mentioned disadvantages.

The aim of this disclosure is to propose a vehicle structure which is easy to adapt to different vehicle configurations.

Another aim of this description is to propose a vehicle structure which is made up of a significantly reduced number of parts compared to prior art solutions.

The technical purpose indicated and the aims specified are substantially achieved by a vehicle structure comprising features as disclosed herein.

This description relates to a vehicle load-bearing structure intended for use as a monocoque for high powered, super sports cars (1000 hp and over), with two- or four-wheel drive, hybrid or internal combustion engine and two or four seats.

One aspect of this description consists in the reduced number of individual structural components, each of which is characterized by a single moulding direction, that is, a single direction of extracting the component from the mould.

In one embodiment of it, a vehicle load bearing structure comprises a cell made of composite materials, preferably carbon fibre reinforced polymers CFRP.

The cell comprises a number n of components between 3 and 8, that is 3<n<8 and at least one system for joining the components to each other to form a single structure.

In a first embodiment, the cell comprises a first component of composite material which may consist of a tub comprising at least a front wall, a rear wall, a first side wall, a second side wall and a bottom wall, together at least partly delimiting the vehicle interior, a second component of composite material which may consist of a front support joined at least to the front wall of the tub on the side opposite to the vehicle interior, a third component of composite material which may consist of a rear support joined at least to the rear wall on the side opposite to the vehicle interior, a fourth component of composite material which may consist of a first longitudinal member joined at least to the first side wall on the side opposite to the vehicle interior, a fifth component of composite material which may consist of a second longitudinal member joined at least to the second side wall on the side opposite to the vehicle interior.

In one embodiment, therefore, the cell is composed of a total of five components joined to each other.

The resulting vehicle structure is characterized by a high level of simplicity, made up of a small number of highly integrated parts, where many functional surfaces are obtained directly in the single operation of moulding the respective component. This feature can allow saving weight because there is no need for fastening elements such as screws, brackets or flanges, which are, for example, formed directly on the raw component leaving the mould.

According to one aspect of the description, the components do not have undercuts, which allows tooling to be greatly simplified, thereby saving on investments and reducing processing times through the use of short cycle time technologies, allowing savings on variable costs.

For the same rigidity, the structures thus obtainable can weigh up to 30% less and can be produced in 44% less time and at a cost which is 30% lower.

The monocoque preferably comprises an internal tub which defines the space intended for vehicle occupants, a front support which allows making a layered section and connecting the structure to the front frame, a rear support which also acts as a shock absorber for lateral and rear impacts and for connecting to a rear frame, two side elements—for example, the sills—which also have a structural function not only to absorb lateral impacts but also to transmit loads between the front and rear of the vehicle, and an upper element or assembly which acts, for example, as a roof and/or as a support for the windshield and/or as a support for the rear window.

According to one aspect of the description, the components, after being produced, are assembled together preferably thanks to specially made interface surfaces and fixed, for example, by gluing and/or co-bonding and/or rivets and/or screws or other method.

In one embodiment, the rear support may be made by assembling different absorption elements on a moulded element common to different types of cars.

That way, it is possible to make cars with different absorption properties using a single moulded element in combination with different absorption elements.

In one embodiment, the sills may be made using two half-shells, each with a single moulding axis. That way, it is possible to obtain a sill which is more robust thanks to the closed cross section and which can be glued or screwed to the tub without interposed flanges or the like.

According to another aspect of the description, the upper assembly can be broken down, for example, into two distinct elements, one internal and one external, both moulded in a single direction.

The assembly is more rigid, thanks to the closed cross section of the pillars and has a better surface finish on the inside.

According to one aspect of the description, the front support and the sills may be preformed so as to also constitute the front frame.

According to another aspect of the description, the rear support and the sills may be preformed so as to also constitute the rear frame.

According to one aspect of the description, this vehicle structure allows making two or more car types by modifying just some of the components of the assembly: for example, modifying the upper assembly allows obtaining a monocoque for a two-seater sports car or a roadster; modifying the front support and the sills allows obtaining a monocoque for a front engine car; modifying the sills allows obtaining a monocoque for a long-base car; modifying the rear support or the front support allows obtaining a monocoque for a car whose design is different from the original—for example, it is possible to obtain a monocoque for a GT car.

BRIEF DESCRIPTION OF THE DRAWINGS

Further features and advantages of the vehicle structure according to one aspect of this description are more apparent in the approximate and hence non-limiting description of a preferred, non-exclusive embodiment of a vehicle structure as illustrated in the accompanying drawings, in which.

DETAILED DESCRIPTION OF PREFERRED EMBODIMENTS OF THE INVENTION

Figure 1:
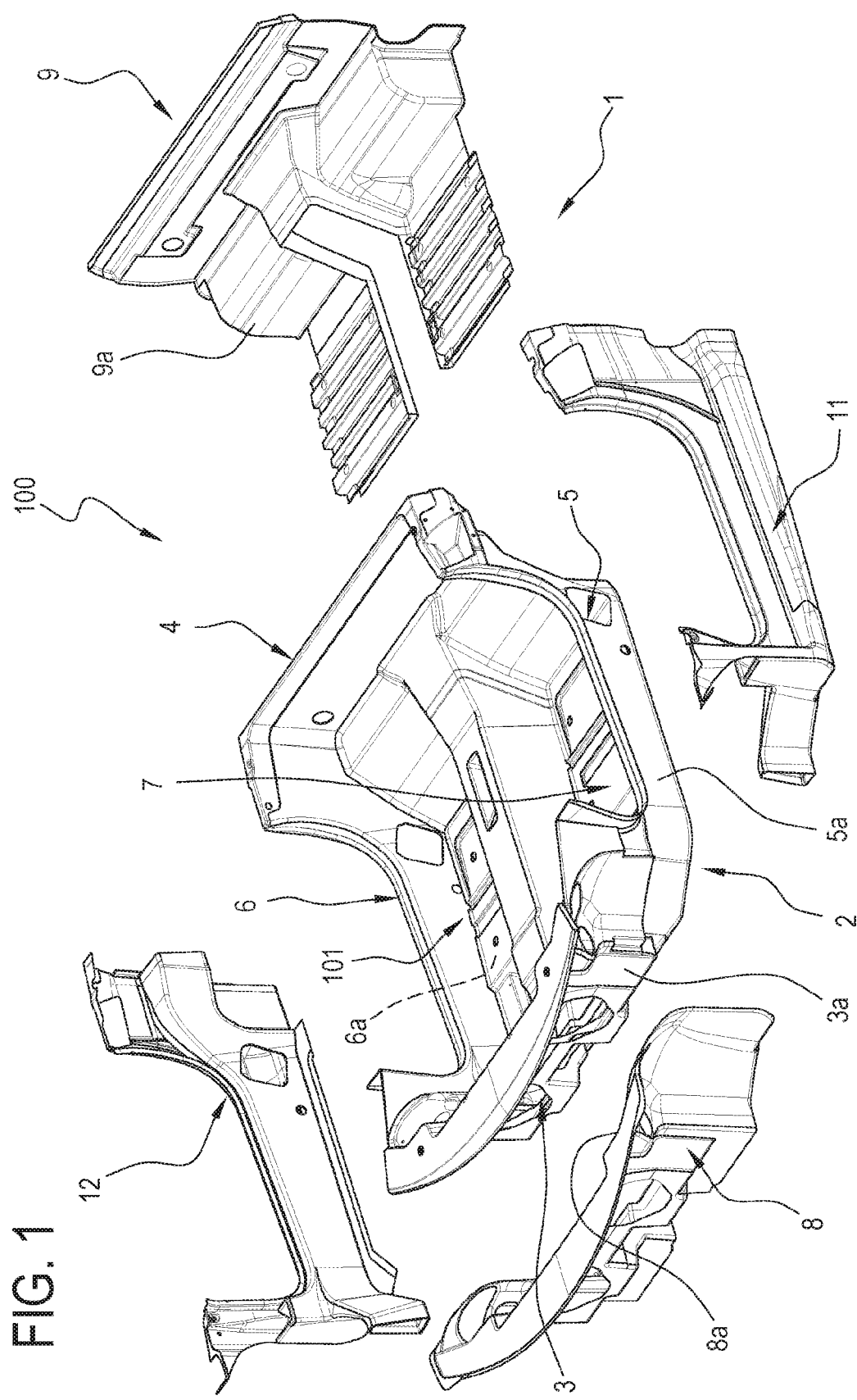
FIG. 1 shows a vehicle structure according to this description in a schematic, exploded perspective view.
Figure 2:
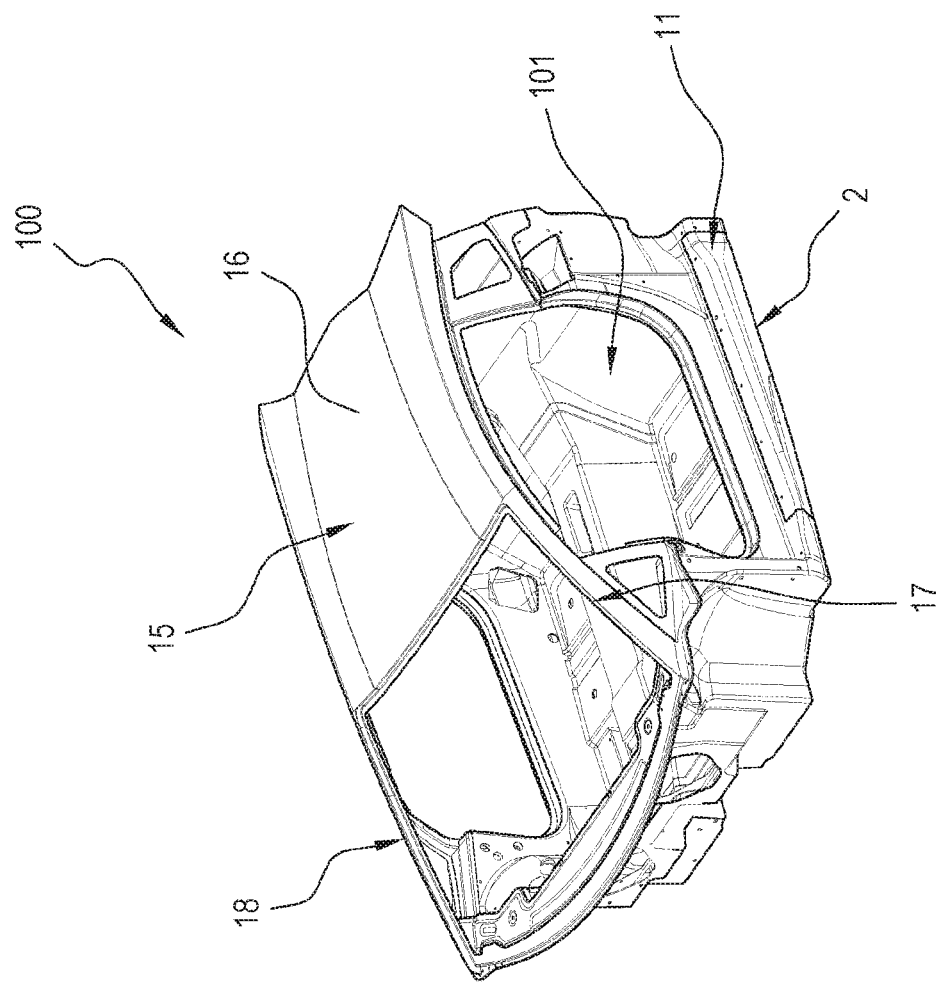
FIG. 2 shows a vehicle structure according to this description in a schematic perspective view.
Figure 3:
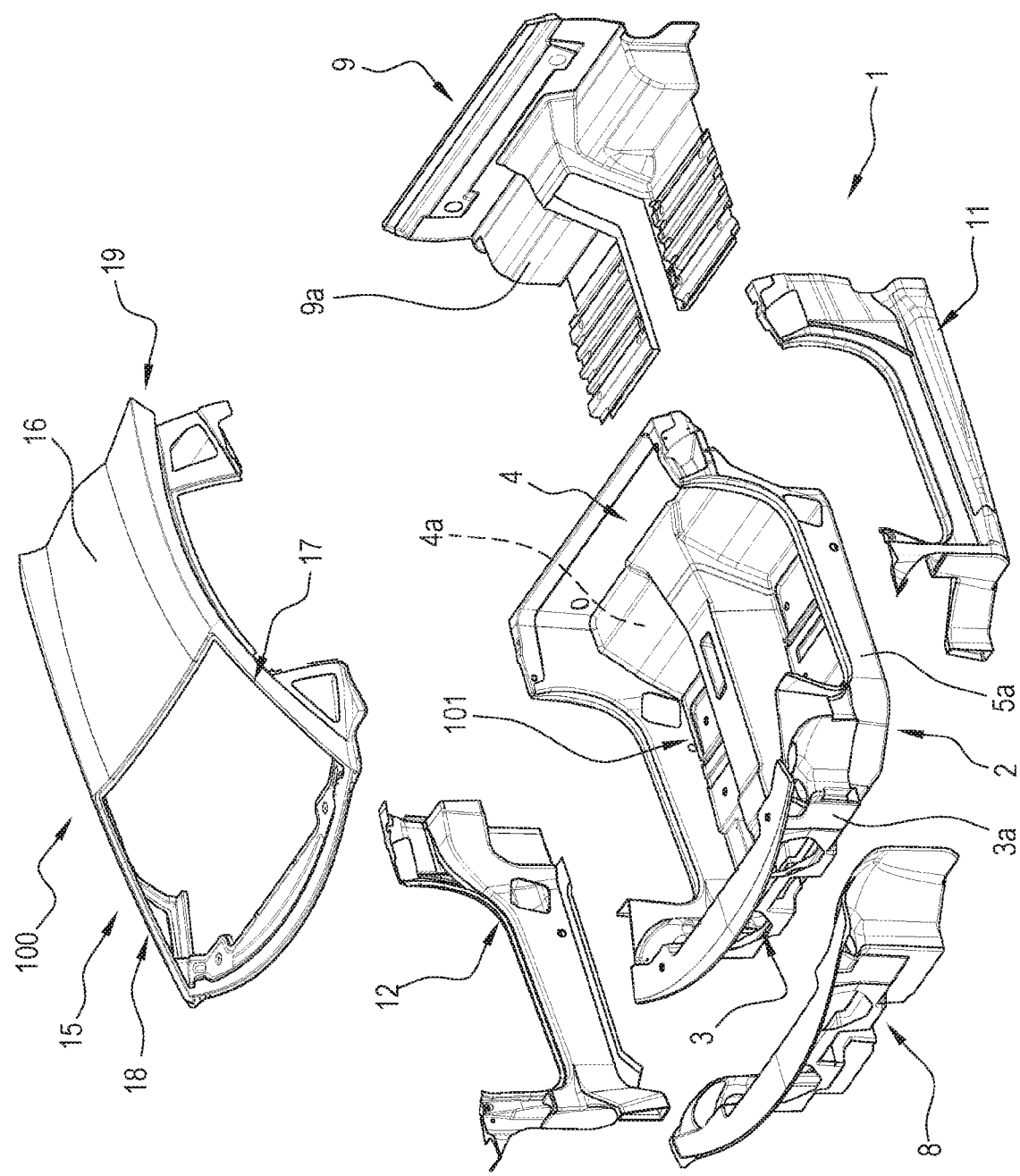
FIG. 3 shows a vehicle structure of the type illustrated in FIG. 2 in a schematic, exploded perspective view.

With reference to FIGS. 1, 2 and 3, the numeral 100 denotes a vehicle structure having a load bearing function; in FIGS. 1 and 3, the structure 100 is shown in exploded views for descriptive purposes.

The structure 100 preferably constitutes what is known as a "monocoque" for a super sports car, generally a car in the horsepower range of approximately 500 HP to 1200 HP, not illustrated.

In cars of this type, relevant to this specification, the monocoque is a single, rigid structure with load-bearing function and is preferably made of carbon fibre reinforced polymers, known in the trade by the acronym CFRP.

In alternative embodiments, other materials or other matrices or other reinforcement fibres may be used.

The structure 100 according to this description comprises a cell 1 is made up of a number n of components between 3 and 8, that is $3<n<8$.

The cell 1 at least one system for joining the separate components to each other to form a single or monolithic structure.

The systems for joining the carbon fibre reinforced polymer components to each other are substantially known and not described in detail.

Generally speaking in this description, reference to components or elements joined to each other means the components or elements are joined by a corresponding joining system.

In these joining systems, the components can, for example, be glued, riveted or screwed to each other or joined by a method known as "co-bonding".

In one embodiment, the cell 1 itself constitutes the entire monocoque of the vehicle.

With reference to FIGS. 1 and 3 in particular, it may be noted that in one embodiment, the cell 1 is made by joining five components.

As mentioned above, the components are made preferably of carbon fibre reinforced polymers, individually moulded, but the use of other materials is also possible.

A first component 2 of the cell 1 consists of a tub which defines the interior 101 of the vehicle, that is, it delimits or identifies a space inside the vehicle, to be occupied by the driver and passengers.

The first component or tub 2 comprises a front wall 3, a rear wall 4, a first side wall 5, a second side wall 6 and a bottom wall 7.

The walls 3, 4, 5 and 6 extend from the bottom wall to define the structure of the tub 2.

The first component 2 has a single moulding direction and does not have undercuts.

In this description, the expression "single moulding direction" is used to mean that the individual parts are made by a single movement of closing and opening a respective mould by means of a corresponding press without any further movements of accessory parts such as carriages or the like—that is to say, to mean that the individual parts do not have undercuts.

The cell 1 comprises a second component 8 consisting of a front support joined at least to the front wall 3 of the tub 2 on the side opposite to the interior 101.

The second component or front support 8 contributes to creating a layered section of the front wall 3 to which a front frame for supporting other parts of the vehicle, such as, a front axle assembly, for example, is connected during the construction of a vehicle.

The second component 8 has a single moulding direction and does not have undercuts.

In one embodiment, the front wall 3 has an interface surface 3a, on the outside of the interior 101, for joining to the second component 8.

Similarly, the second component 8 has an interface surface 8a for joining to the first component 2.

The first and second components 2 and 8 are joined by one of the aforesaid joining systems by means of the respective interface surfaces 2a, 8a.

In the jargon of the trade, the second component 8 may also be called front flame trap.

The cell 1 comprises a third component 9 consisting of a rear support joined at least to the rear wall 4 of the tub 2 on the side opposite to the interior 101.

The rear support, defined by the third component 9, also preferably acts as a shock absorber for rear and lateral impacts.

The rear support also constitutes a portion of the cell for connection to a rear frame during the construction of the vehicle.

The rear frame is used, for example, to support and connect the rear axle assembly and the engine and gearbox assembly of the vehicle.

The third component 9 has a single moulding direction and does not have undercuts.

In one embodiment, the rear wall 4 has an interface surface 4a, on the outside of the interior 101, for joining to the third component 9.

Similarly, the third component 9 has an interface surface 9a for joining to the first component 2.

The first and third components 2 and 9 are joined by one of the aforesaid joining systems by means of the respective interface surfaces 2a, 9a.

In the jargon of the trade, the third component 9 may also be called rear flame trap.

Figure 4:
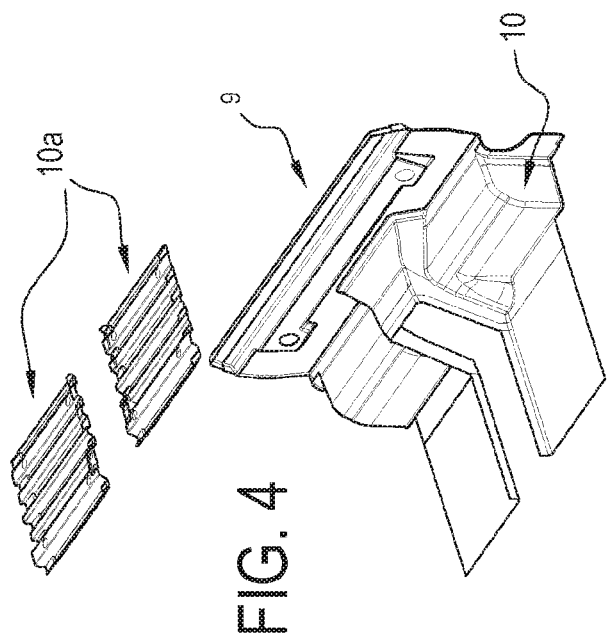
FIG. 4 shows a detail of the vehicle structure according to this description in a schematic, exploded perspective view.

With reference to FIG. 4, it may be observed that in one embodiment, the third component 9 comprises a main element 10, preferably moulded in carbon fibre reinforced polymer composite, and at least one absorption element 10a assembled on the element 10.

The element 10a gives the element 10, hence the component 9, predetermined shock absorbing properties.

This configuration makes it possible, for example, to make an element 10 which is common to a multiplicity of different vehicles and to which the necessary absorption properties are given by means of the elements 10a according to the type of vehicle to be made.

In an embodiment not illustrated of the cell 1, the second and third components 8 and 9 are made as a single component moulded preferably in carbon fibre reinforced polymers and in turn joined to the tub 2.

That way, as will become clearer as this description continues, the cell 1 is defined by a total of four components which are joined to each other.

The cell 1 comprises a fourth and a fifth component 11, 12 consisting of a first longitudinal member and a second longitudinal member, respectively.

In the jargon of the trade, the fourth and fifth components are called "sills" and allow absorbing lateral shocks and transmitting loads between the front and rear of the vehicle.

In a preferred embodiment, the sills have a closed main cross section.

Figure 5:
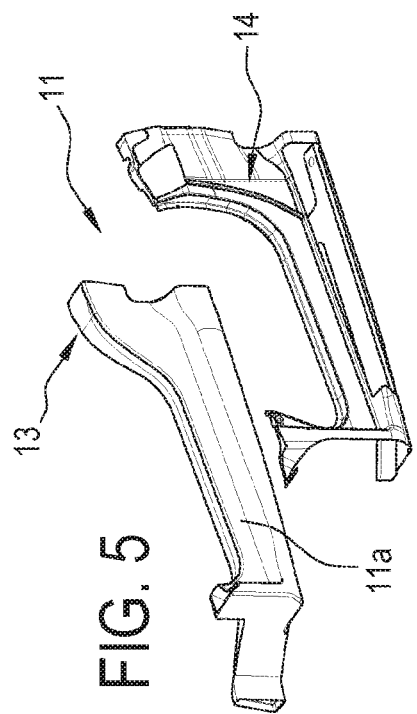
FIG. 5 shows a second detail of the vehicle structure according to this description in a schematic, exploded perspective view.

With reference to FIG. 5, it may be observed that in one embodiment, the sills 11 and 12, only one of which is illustrated, are each made up of a first and a second half-shell 13, 14 which are coupled to each other.

Thus, the fourth and fifth components 11 and 12 have a closed main cross section, not illustrated in detail.

The sills 11 and 12 thus obtained are robust and can be glued or screwed directly to the tub 2.

The first and second half-shells 13, 14 of the fourth and fifth components 11, 12 each have a respective single moulding direction and do not have undercuts.

With reference to FIG. 3, in one embodiment, fourth and fifth components 11, 12 have an open main cross section.

Preferably, the sills 11 and 12 have a single moulding direction and do not have undercuts.

The fourth component or sill 11 is joined at least to the aforesaid first side wall 5 on the side opposite the interior 101 and the fifth component or sill 12 is joined at least to the aforesaid second side wall 6 on the side opposite the interior 101.

In a preferred embodiment, the side wall 5 and the side wall 6 each have a respective interface surface 5a, 6a.

Similarly, the sill 11 and the sill 12 have respective interface surfaces 11a and 12a.

The tub 2 is joined to the sills 11 and 12 by means of the interface surfaces 5a, 6a and the interface surfaces 11a, 12a of the fourth and fifth components 11, 12.

The components 11 and 12 might also be joined to the tub 2 by means of flanges not illustrated.

It should be noted that based on whether the main cross section of the sills 11, 12 is open or closed, the interface surfaces are modified accordingly in different ways.

More specifically, in the case where the sills 11, 12 have an open cross section, as illustrated in FIG. 3, for example, the surfaces 5a and 6a of the walls 5 and 6 are preferably shaped to contribute to making a structure whose main cross section is closed once coupled to the respective sill.

In one embodiment, the cell 1 is thus defined by five components joined to each other, that is, by the tub 2 to which the front support 8, the rear support 9 and the sills 11 and 12 are joined.

In a different embodiment, as mentioned above, the cell 1 is defined by four components joined to each other, that is, by the tub 2 to which the sills 11 and 12 and a fourth component, defined by the front support 8 and the rear support 9 co-moulded as a single part, are joined.

In an embodiment not illustrated, the second component 8, together with the fourth and fifth components 11, 12 constitute a unit having a pair of protrusions extending away from the first component and defining the aforementioned front frame.

In practice, the front support 8 and the sills 11, 12 may be shaped or preformed so as to also constitute the front frame.

The structure 100 in this embodiment, while still being defined by a limited number of components, also integrates the front frame.

In one embodiment, the third component 9, and the fourth and fifth components 11, 12 constitute a unit having a pair of protrusions extending away from the first component 2 and defining the aforementioned rear frame.

In practice, the rear support 9 and the sills 11, 12 may be shaped or preformed so as to also constitute the front frame.

The structure 100 in this embodiment, while still being defined by a limited number of components, also integrates the rear frame.

In the embodiment illustrated in FIGS. 2 and 3 in particular, the structure 100 comprises an upper assembly 15 made of composite material—for example, carbon fibre reinforced polymers CFRP.

In one embodiment, the upper assembly 15 is moulded in a single part and in a single moulding direction.

The assembly 15 is joined to the cell 1 to define a single structure; the assembly 15 is joined to the cell 1 for example by gluing.

In practice, the monocoque of the vehicle consists of the cell 1, which constitutes a bottom part, and the upper assembly 15.

The assembly 15 comprises a covering element or roof 16, a first and a second front pillar 17, 18 and a rear unit 19 extending from opposite sides of the roof 16.

The covering element 16 is joined to the cell 1 by means of the pillars 17 and 18 and the rear unit 19 at the wall 3 and the wall 4 of the tub 2, respectively.

The assembly 15 is provided with engagement elements for connecting and joining to the cell 1.

Figure 6:
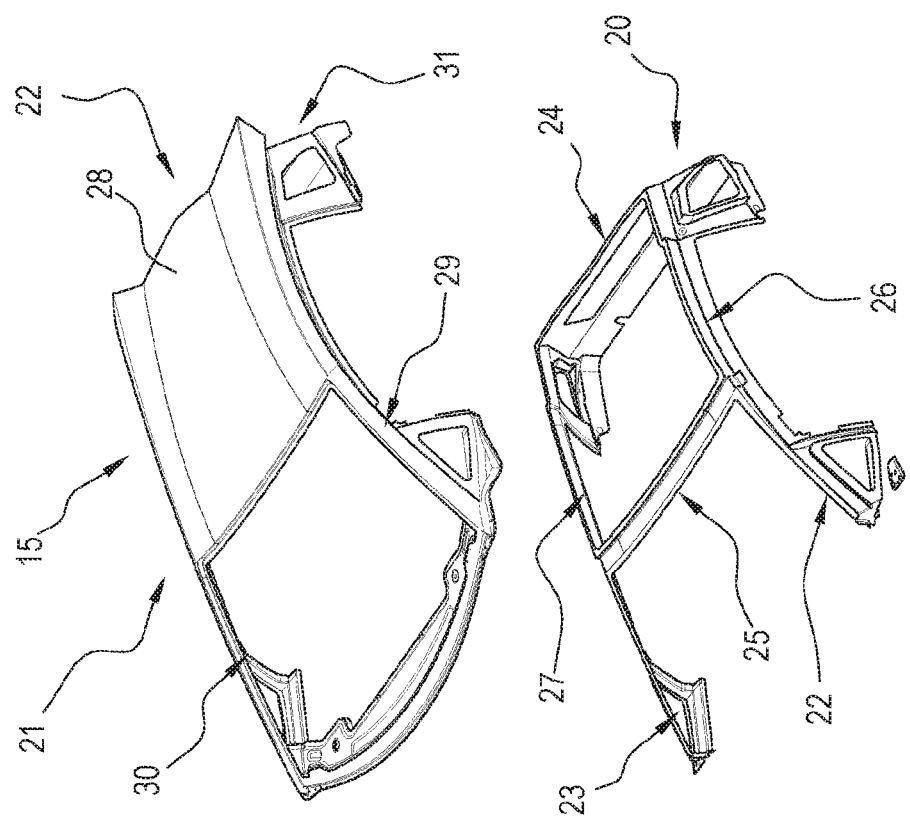
FIG. 6 shows a third detail of the vehicle structure according to this description in a schematic, exploded perspective view.

In an embodiment illustrated in FIG. 6, the upper assembly 15 comprises a first, internal element 20, directed towards the interior 101 when the upper assembly 15 is joined to the cell 1, and a second, external element 21, disposed on the side opposite the interior 101 with respect to the internal element 20 when the upper assembly 15 is joined to the cell 1.

The first, internal element 20 comprises an internal portion 22 of the first pillar 17, an internal portion 23 of the second pillar 18 and an internal portion 24 of the rear unit 19.

The portions 22 and 23 are connected to each other by a crosspiece 25 and to the rear portion 24 by respective joining elements 26, 27 which can also be considered as extensions of the corresponding portions 22 and 23.

The internal element 20 of the upper assembly 15 is moulded as a single part and in a single moulding direction.

The second, external element 21 comprises a covering element or roof 28, an external portion 29, 30 of the pillars 17 and 18 and an external portion 31 of the rear unit 19.

The internal element 21 of the upper assembly 15 is moulded as a single part and in a single moulding direction.

Joining the elements 20 and 21 allows, amongst other things, obtaining a closed cross section for the pillars 17 and 18, giving the pillars 17 and 18 greater stiffness compared to pillars with an open cross section.

In an embodiment not illustrated, the upper assembly 15 comprises a first and a second front pillar and a pair of crosspieces joining the pillars to define a frame for the windshield of the vehicle.

In that case, when the assembly is joined to the cell 1, substantially at the front wall 3 of the tub 2, the load-bearing body 100 of a two-seater car is defined.

In an embodiment not illustrated, the upper assembly 15, besides the frame for the windshield, also comprises a rear unit for supporting the rear window of the vehicle.

In that case, when the assembly 15 is joined to the cell 1, with the windshield frame joined substantially at the front wall 3 of the tub 2 and the rear unit joined substantially at the rear wall 4 of the tub, the load-bearing body 100 of a roadster is defined.

Making the structure 100 with a finite, limited number of components joined to each other makes the structure 100 easy to modify so that different types of cars can be made by changing only a few components of the entire structure.

Since the components of the structure according to this description each have a single moulding direction, the machinery used to make them is also relatively simplified.

For example, modifying the upper assembly allows obtaining, as mentioned above, a load-bearing structure for a coupé or a two-seater or a roadster.

Modifying the second, fourth and fifth components, that is, the front support and the sills in the example described, allows obtaining, for example, a load-bearing structure for a front engine car.

Modifying the fourth and fifth components, that is, the sills in the example described, allows obtaining, for example, a load-bearing structure for a long-base car.

Modifying the third component, that is, the rear support in the example described, allows obtaining, for example, a load-bearing structure for what is known as a GT.

As mentioned, the components are made of composite materials and obtained by moulding.

The preferred moulding methods, which give the components predetermined technical properties, include those known as "Resin Transfer Moulding (RTM)", "Braiding" e "Prepreg".

The production processes of these methods differ in the type of carbon fibre used, the respective interlacement and the chemical composition of the synthetic resin used.

In the RTM method, the rolls of carbon fibre are preformed and impregnated with a predetermined quantity of resin. They are then heat hardened while the component is in process.

Patent document EP2574449 in the name of the same applicant as the present addresses a development of this moulding method.

In the prepreg method, the rolls of carbon fibre are pre-impregnated with a liquid, thermosetting resin and must be stored at low temperature. Next, the rolls are laminated in moulds and hardened in an autoclave at suitable heat and pressure. Components made with the prepreg method guarantee a high quality surface finish and thus constitute the preferred solution for parts to be mounted in visible positions.

The braiding method is used to make tubular components for special applications such as, for example, structural pillars and the profiles of the bottom section; interlacing is accomplished by diagonally cross-linking the fibres in different layers.

The invention claimed is:

1. A system of load-bearing structures from which a vehicle is constructed in a number of different configurations, comprising:
   a cell made of composite materials and comprising a plurality of components; and
   at least one system for joining the components to each other to form a single structure,
   wherein the cell is made up of a number n of components between 3 and 8, such that $3<n<8$;
   an upper assembly made of composite materials and joined to the cell to define the single structure;
   wherein the upper assembly is configured in a vehicle style selected from a group consisting of a coupe, a two-seater, a roadster, a front engine car, and a GT car, and a configuration of the vehicle is changeable based on the vehicle style of the upper assembly joined to the cell.

2. The system according to claim 1, wherein the cell comprises:
   a first component configured as a tub comprising a front wall, a rear wall, a first side wall, a second side wall and a bottom wall, together at least partly delimiting an interior of the vehicle;
   a second component configured as a front support joined to the front wall on a side opposite to the interior;
   a third component configured as a rear support joined to the rear wall on the side opposite to the interior;
   a fourth component configured as a first longitudinal member joined at least to the first side wall on the side opposite to the interior;
   a fifth component configured as a second longitudinal member joined at least to the second side wall on the side opposite to the interior, the cell being made up of a total of the first through fifth components which are joined to each other.

3. The system according to claim 2, wherein at least one chosen from the first component, the second component, the third component, the fourth component, and the fifth component is a molded component having a single molding direction.

4. The system according to claim 2, wherein the front wall has an interface surface, the second component has an interface surface, the first component and the second component being joined by the interface surface of the front wall and the interface surface of the second component.

5. The system according claim 2, wherein the rear wall has an interface surface, the third component has an interface surface, the first component and the third component being joined by the interface surface of the rear wall and the interface surface of the third component.

6. The system according to claim 2, wherein the first side wall and the second side wall each have a respective interface surface, the fourth component has an interface surface, the fifth component has an interface surface, the first component, the fourth component and the fifth component being joined respectively by the interface surface of the first side wall and the interface surface of the fourth component, and the interface surface of the second side wall and the interface surface of the fifth component.

7. The system according to claim 2, wherein the third component comprises a molded main element of composite material and at least one absorption element assembled to the main element, the absorption element conferring predetermined absorption properties to the third component.

8. The system according to claim 2, wherein the fourth and fifth components each have a closed transverse cross section.

9. The system according to claim 8, wherein the fourth and fifth components each include a first and a second half-shell which are coupled to each other, the first and second longitudinal members having a closed cross section.

10. The system according to claim 9, wherein the first and second half-shells of the fourth and fifth components each have a respective single molding direction.

11. The system according to claim 2, wherein the second component, the fourth component and the fifth component constitute a unit comprising a first and a second protrusion extending away from the front wall and defining a front frame.

12. The system according to claim 2, wherein the third component, the fourth component and the fifth component constitute a second unit comprising a third and a fourth protrusion extending away from the rear wall and defining a rear frame.

13. The system according to claim 1, wherein the cell comprises:
a first component configured as a tub comprising a front wall, a rear wall, a first side wall, a second side wall and a bottom wall, together at least partly delimiting an interior of the vehicle;
a second component configured as a front support joined to the front wall on a side opposite to the interior;
a third component configured as a rear support joined to the rear wall on the side opposite to the interior;
a fourth component configured as a first longitudinal member joined at least to the first side wall on the side opposite to the interior;
a fifth component configured as a second longitudinal member joined at least to the second side wall on the side opposite to the interior;
wherein the second and third components are made as a single sixth component molded as a single part, the cell being defined by a total of the first, fourth and sixth components which are joined to each other.

14. The system according to claim 1, wherein the vehicle style of the upper assembly comprises a covering element, a first and a second front pillar and a rear unit extending from opposite ends of the covering element, the upper assembly being joined to the cell by the first and second front pillars and the rear unit respectively at a front wall and a rear wall of the cell.

15. The system according to claim 14, wherein the upper assembly is a molded single part.

16. The system according to claim 14, wherein the upper assembly comprises a first, inner element and a second, outer element which are joined to each other, the first, inner element comprising at least one inner portion of the first and second front pillars and an inner portion of the rear unit, the second, outer element comprising at least a second covering element, an outer portion of the first and second front pillars and an outer portion of the rear unit, the first, inner element and the second, outer element being each a single molded part having a single molding direction.

17. The system according to claim 14, wherein the first and second front pillars each has a closed cross section.

18. The system according to claim 1, and further comprising a windshield, wherein the vehicle style of the upper assembly comprises a first and a second front pillar and at least one crosspiece joining the first and second front pillars to define a frame for the windshield, the windshield being joined to the cell at a front wall of a tub forming part of the cell.

19. The system according to claim 1, wherein the cell includes a tub having a rear wall, wherein the vehicle style of the upper assembly comprises a rear unit for supporting a rear window of the vehicle and is joined to the cell at the rear wall of the tub.

20. The system according to claim 1, wherein the cell includes a tub having a rear wall, wherein the vehicle style of the upper assembly comprises a rear unit joined to the cell at the rear wall of the tub.

21. The system according to claim 1, wherein the vehicle style of the upper assembly comprises a first and a second front pillar and a rear unit, the upper assembly being joined to the cell by the first and second front pillars and the rear unit respectively at a front wall and a rear wall of the cell.

22. A method for constructing a vehicle in a number of different configurations from a plurality of load-bearing structures; the method comprising:
providing a cell made of composite materials and comprising a plurality of components;
joining the components to each other to form a single structure,
wherein the cell is made up of a number n of components between 3 and 8, such that 3<n<8;
providing a plurality of upper assemblies configured in different vehicle styles selected from a group consisting of a coupe, a two-seater, a four-seater, a roadster, a front engine car and a GT car, and selecting the vehicle style of the of the vehicle based on the style of the upper assembly to be joined to the cell;
providing that the upper assembly is made of composite materials;
joining the upper assembly to the cell to define the single structure to provide the style of the vehicle.

23. The method according to claim 22, wherein the vehicle style of the upper assembly comprises a covering element, a first and a second front pillar and a rear unit extending from opposite ends of the covering element, the upper assembly being joined to the cell by the first and second front pillars and the rear unit respectively at a front wall and a rear wall of the cell.

24. The method according to claim 22, and further comprising a windshield, wherein the vehicle style of the upper assembly comprises a first and a second front pillar and at least one crosspiece joining the first and second front pillars to define a frame for the windshield, the windshield being joined to the cell at a front wall of a tub forming part of the cell.

25. The method according to claim 22, wherein the cell includes a tub having a rear wall, wherein the vehicle style of the upper assembly comprises a rear unit joined to the cell at the rear wall of the tub.

26. The method according to claim 22, wherein the vehicle style of the upper assembly comprises a first and a second front pillar and a rear unit, the upper assembly being joined to the cell by the first and second front pillars and the rear unit respectively at a front wall and a rear wall of the cell.

* * * * *